Dec. 8, 1925.
J. PODMAJERSKY
VEHICLE FENDER
Filed July 18, 1924
1,564,620
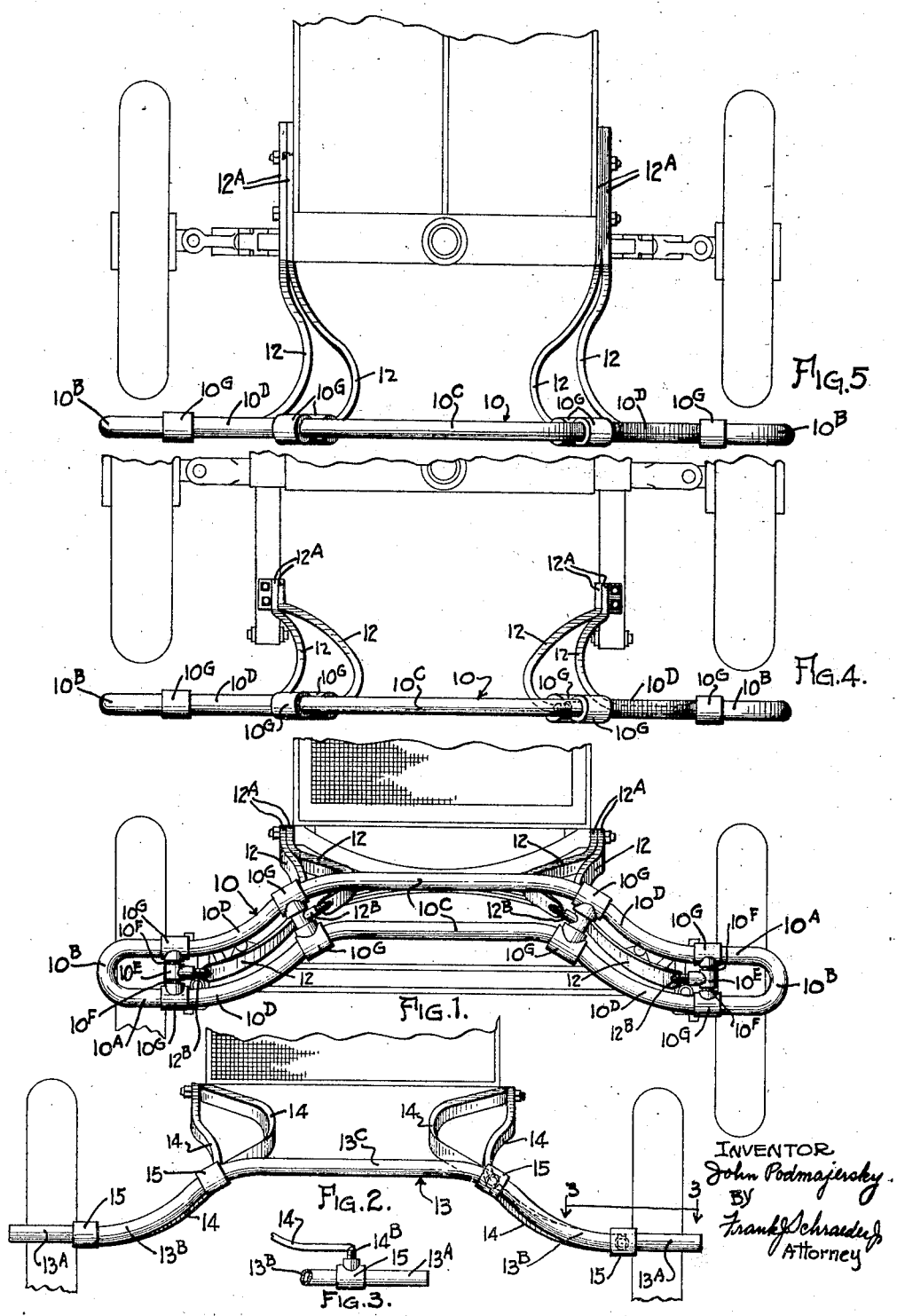

Patented Dec. 8, 1925.

1,564,620

UNITED STATES PATENT OFFICE.

JOHN PODMAJERSKY, OF CHICAGO, ILLINOIS.

VEHICLE FENDER.

Application filed July 18, 1924. Serial No. 726,715.

*To all whom it may concern:*

Be it known that I, JOHN PODMAJERSKY, a citizen of the Republic of Czechoslovakia, residing at Chicago, in the county of Cook and State of Illinois, have invented new and useful Improvements in Vehicle Fenders, of which the following is a specification.

This invention relates to fenders for automobiles and the like, and has among its objects to provide a fender of simple construction which shall include a bumper or abutment member of novel and rigid design supported on resilient members.

Another object of my invention is the provision of a fender having the abutment member of a design wherein the intermediate portion thereof extends above the end portions which fend the wheels.

A still further object of my invention resides in the provision of a fender having the abutment member thereof made of a pipe or tubular section.

With these and other objects in view, my invention consists in the novel combination, construction and arrangement of the parts and members, shown in the accompanying drawings, described in the following specifications and particularly pointed out in the appended claims.

Referring to the drawings wherein like reference characters indicate like or corresponding parts, Figure 1 is a front elevation of a preferred embodiment of my invention as applied to a Ford automobile.

Figure 2 is a front elevation of a fender comprising an abutment member of a single pipe section.

Figure 3 is a plan view taken on line 3—3 of Fig. 2, showing the connection of the resilient support to the T connection.

Figure 4 is a plan view of my improved fender as applied to the forward end of the frame spring-extension.

Figure 5 is a plan view of my fender as applied to the Ford automobile.

Referring to the drawings, particularly to Figures 1, 4 and 5 showing the preferred embodiment of my invention, the bumper or abutment member generally indicated by numeral 10, comprises a continuous tubular member forming substantially a pair of bent parallel sections $10^A$ having rounded end portions $10^B$ located approximately on the center line or axis of the front wheels of the vehicle.

The central or intermediate portion $10^C$ of the double section is raised above the end portions $10^B$ and joined thereto by compound-curved portions $10^D$.

To stiffen the double tubular section and to afford a connection for the supporting resilient members, I provide T connections $10^E$ which are joined by short nipples $10^F$ to the T connections $10^G$.

The abutment member 10 is supported on suitably curved resilient members 12 the rear ends $12^A$ of which are fixed to the frame of the vehicle and the outer ends $12^B$ being formed into a rounded and threaded end for connection with the T connections $10^E$.

It may be stated that while I provide two sets or pairs of stiffening connections for the abutment member, the fender may be built with only one pair, or two sets may be provided as shown, but only one set, either the inner or outer, may be supported on the resilient members 12.

The simplified modification in Figures 2 and 3, embodies only a single tubular member 13 having straight or lateral ends $13^A$ and a central or intermediate raised portion $13^C$ which is connected by compound-curved portions $13^B$ to the ends $13^A$. The supporting resilient members 14 are similar to those above described and are connected with the T connections 15.

I claim:

1. A vehicle fender comprising an abutment member, and resilient supports for said member, said member comprising a continuous tubular member forming substantially a pair of parallel sections, the central or intermediate portions of said sections being bent upwardly out of lateral alignment with the end portions of said sections.

2. A vehicle fender comprising an abutment member, and resilient supports for said member, said member comprising a continuous tubular member forming substantially a pair of parallel sections, the central or intermediate portions of said sections being bent upwardly out of lateral alignment with the end portions of said sections but occupying the same vertical plane.

3. A vehicle fender comprising an abutment member and resilient supports for said member, said member comprising a tubular member having the central or intermediate portion thereof bent out of lateral alignment with the end portions thereof but occupying the same vertical plane.

4. A fender as embodied in claim 1 and including each of said supports arranged for connection with said member at two separate points.

5. A fender as embodied in claim 2 and including each of said supports arranged for connection with said member at two separate points.

6. A fender as embodied in claim 3 and including each of said supports arranged for connection with said member at two separate points.

7. A vehicle fender, comprising an abutment member of a continuous tubular body forming substantially a pair of parallel sections, the central or intermediate portions of said sections being bent upwardly out of lateral alignment with the end portions of said sections but occupying the same vertical plane, stiffener connections between said sections, and resilient supports for said abutment member attached to the vehicle and connected with said stiffener connections.

In witness whereof I affix my signature.

JOHN PODMAJERSKY.